United States Patent

[11] 3,624,029

| [72] | Inventors | Masaaki Inagami<br>Yokohama-shi;<br>Keiji Komuro, Tokyo, both of Japan |
|---|---|---|
| [21] | Appl. No. | 830,701 |
| [22] | Filed | June 5, 1969 |
| [45] | Patented | Nov. 30, 1971 |
| [73] | Assignee | The Japanese Geon Company, Ltd.<br>Tokyo, Japan |
| [32] | Priority | June 12, 1968 |
| [33] | | Japan |
| [31] | | 43/39904 |

[54] HALOGEN-CONTAINING POLYMERIC RUBBER COMPOSITIONS HAVING IMPROVED SCORCH RESISTANCE
4 Claims, 1 Drawing Fig.

[52] U.S. Cl...................................................... 260/45.9 R,
260/2 A, 260/45.85 R, 260/92.3 R, 260/94.7 S
[51] Int. Cl....................................................C08d 11/04,
C08f 45/60
[50] Field of Search........................................... 260/45.85,
45.9, 92.3, 94.7 S, 88.3 A, 2 EP, 2 A

[56] References Cited
UNITED STATES PATENTS

| 2,227,517 | 1/1941 | Starkweather | 260/92.3 |
|---|---|---|---|
| 2,234,211 | 3/1941 | Walker | 260/45.9 |
| 3,239,486 | 3/1966 | Willis | 260/2 |
| 3,293,321 | 12/1966 | Layer | 260/45.9 |

Primary Examiner—Donald E. Czaja
Assistant Examiner—V. P. Hoke
Attorney—Sherman and Shalloway ABSTRACT: A halogen-containing polymeric rubber composition having improved scorch resistance, said composition comprising 100 parts by weight of a halogen-containing polymeric rubber having incorporated therein, as a antiscorching agent 0.1–5.0 parts by weight of at least one compound of the formula
$$SH-R-(X)_n$$
wherein R is selected from the group consisting of the aliphatic, alicyclic and aromatic hydrocarbon radicals, X is selected from the group consisting of amino, imino and carboxyl radical, and $n$ is a number from 1 to 2. and 0.5 to five parts per weight of an amino-containing cross-linking agent.

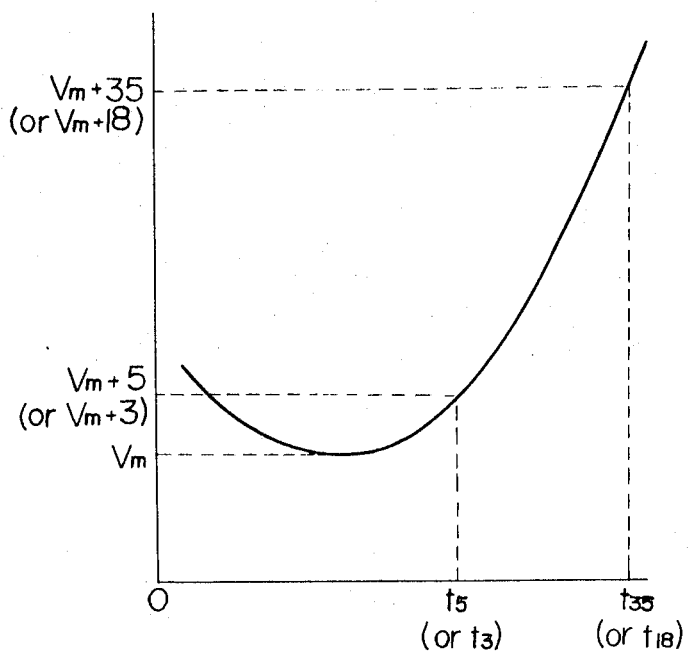

HALOGEN-CONTAINING POLYMERIC RUBBER COMPOSITIONS HAVING IMPROVED SCORCH RESISTANCE

This invention relates to halogen-containing polymeric rubber compositions having improved scorch resistance. More particularly, the invention relates to halogen-containing polymeric rubber compositions having improved scorch resistance which are obtained by compounding a halogen-containing polymeric rubber with 0.1–5.0 parts by weight per 100 parts by weight of the rubber of at least one compound having the formula $$SH-R-(X)_n$$

wherein R is either an aliphatic, alicyclic or aromatic hydrocarbon radical, X is either an amino, imino or carboxyl radical and n is either 1 or 2.

The halogen-containing polymeric rubber, e.g., polychloroprene, chlorinated butyl rubber, chlorinated polyethylene rubber, halogen-containing acrylic rubber, polyepichlorohydrin rubber and epichlorohydrin-olefin oxide copolymer rubber, have very excellent characteristics with respect to their chemical resistance, resistance to solvents and heat resistance on account of the halogen atoms contained therein. Hence, they are well-known as being commercially valuable rubbers.

These halogen-containing polymeric rubbers are cross-linked by means of an amino compound such as alkyl substituted thiourea and polyamines. However, when the halogen-containing polymers are cross-linked using these cross-linking agents, frequently premature cross-linking (also referred to as scorching) takes place to render the subsequent processing difficult.

Especially, under the circumstance where furnace black (which tends to become the cause of scorching) is used frequently, the prevention of this scorching has become a serious problem in the rubber industry.

While, methods of preventing the scorching of rubber, such as, spreading the rubber material out in a cool place, reducing the viscosity of the rubber material, reducing the amount compounded of the cross-linking agent and cross-linking accelerator, and using an improved cross-linking accelerator have been prepared, the procedure usually employed is that of kneading in an antiscorching agent in advance of cross-linking. As this antiscorching agent, an organic acid compound such as benzoic or phthalic acid is usually used. However, when these organic acid compounds are used as the antiscorching agent for halogen-containing polymeric rubbers whose cross-linking is carried out with amine compounds, the final rubber product that results after the cross-linking becomes one of inferior quality whose tensile stress (modulus) is low.

Accordingly, the object of the present invention is to provide a halogen-containing polymeric rubber composition whose scorch resistance is high without sacrificing the quality of the product.

The foregoing object of this invention is achieved by the incorporation in the halogen-containing polymeric rubbers as an antiscorching agent the compound of the formula $SH-R-(X)_n$.

While the R in the formula $SH-R-(X)_n$ can, as hereinbefore indicated, be a group selected from the broad group consisting of the aliphatic, alicyclic and aromatic hydrocarbon radicals, generally preferred is the lower aliphatic group, benzene nucleus or naphthalene nucleus.

As compounds comprehended by the foregoing formula, which are conveniently useable in the present invention, mention can be made of the following typical examples:

2-mercaptoethylamine ($SH-CH_2CH_2-NH_2$)

2-mercaptopropylamine 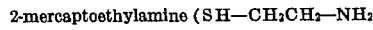

iminoethylmercaptan 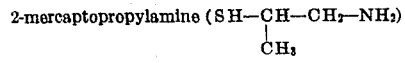

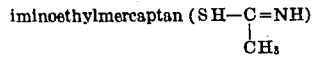

ortho-aminothiophenol 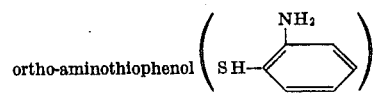

meta-aminothiophenol 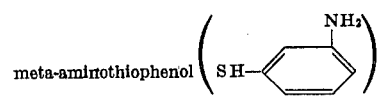

para-aminothiophenol 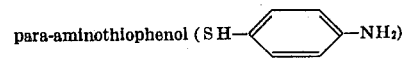

2-amino-4-mercaptotoluene 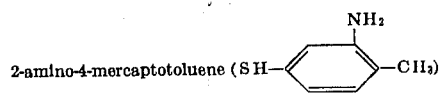

α—aminothionaphthol 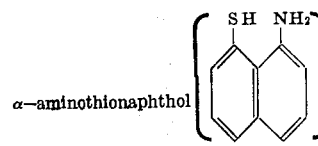

β-aminothionaphthol 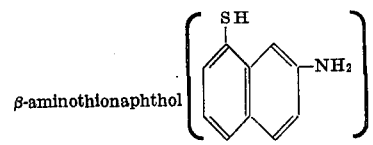

1-mercapto-3-aminocyclohexane 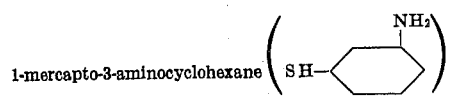

L-cysteine 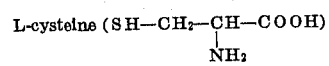

thioglycollic acid ($SH-CH_2-COOH$), and thiosalicyclic acid 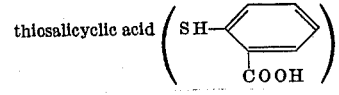

Specific examples of the halogen-containing polymeric rubbers to which the present invention can be applied include such as polychloroprene rubber, chlorinated butyl rubber, ethyl acrylate-chloroethylvinylether copolymer rubber (one class of acrylic rubber), fluorine-containing rubber, chlorinated polyethylene rubber, epichlorohydrin polymer rubber, epichlorohydrin-ethylene oxide copolymer rubber and epichlorohydrin-propylene oxide copolymer rubber.

A single class of the antiscorching agent can be used as well as a combination of two or more classes thereof. On the other hand, the amount of the antiscorching agent that is effectively used is 0.1–5.0 parts, and preferably 0.2–2.0 parts per 100 parts of the rubber (weight basis; the parts given hereinafter are likewise all on a weight basis). An addition in an amount of less than 0.1 part does not bring about any conspicuous results, whereas an addition exceeding 5.0 parts is not practical since it is uneconomical though scorch preventive effects are brought about.

The incorporation of the antiscorching agent in the rubber may be carried out by any of the conventional mixing techniques. It is preferable that these antiscorching agents be incorporated into rubber before compounding of a cross-linking agent with it.

The halogen-containing polymeric rubber blend incorporated with 0.1–5.0 parts of the antiscorching agent has a scorch resistance which is markedly superior to that of the conventional blend containing an acid substance. Even the properties of the rubber obtained by effecting the cross-linking of this composition, are comparable to the rubber not containing the antiscorching agent, or even superior. The physical properties of the cross-linked rubber are further enhanced when carbon black is used as a reinforcing material.

The cross-linking agents suitable for cross-linking the halogen-containing polymeric rubbers include the aliphatic polyamines such as ethylene diamine, hexamethylene diamine, diethylene triamine and triethylene tetramine, the aromatic polyamines such as p-phenylene diamine, m-phenylene diamine and cumene diamine, the polyamine carbamates such as ethylene diamine carbamate and hexamethylene diamine carbamate, the ketopolyamines and thioketopolyamines such as urea, biuret, thiourea, dibutylthiourea and trimethylthiourea, and further those consisting of a metal compound selected from the group consisting of aromatic and aliphatic carboxylates, carbonates, phosphates and oxides of the metals of groups IIA, IIB and IVB of the periodic table, used conjointly with either 2-mercaptoimidazolines or 2-mercaptorpyrimidines. These cross-linking agents are used either singly or in combinations of two or more, and they are usually used in an amount of 0.5–5.0 parts per 100 parts of the rubber.

Aside from the foregoing halogen-containing polymeric rubber, antiscorching agent and cross-linking agent, other compounding agents that are usually used in the conventional rubber blends such as, for example, cross-linking accelerators, stabilizers, age resisters, reinforcing agents and plasticizers may also be added to the rubber composition as required.

Next, the present invention will be more specifically described by means of the following examples and controls.

The Mooney scorch test was carried out in these examples and controls in accordance with the method of JIS K–6300 except that the measuring temperature was changed to either 120° C. or 150° C. This Mooney scorch test consists in measuring with a Mooney viscometer the changes in the viscosity of the specimen rubber composition at the foregoing temperatures as the cross-linking proceeds. The Mooney viscometer, as is well-known, is made up of a rotor, a hollow cylindrical dies which encloses the test piece and the rotor, a torque indicator, a heater and a temperature regulator. In conducting the measurement, a large rotor is used when the viscosity of the specimen rubber composition is relatively low and a small rotor when the viscosity is relatively high. The drawing is a graph explaining the test procedure.

As shown in FIG. 1, after the test is started, the Mooney viscosity value first declines with the passage of time and reaches a minimum value (Vm) and thereafter rises. When the large rotor has been used, the time $t_5$ (min) required for the Mooney viscosity value to reach $(V_m+_5)$ after the start of the test is recorded. On the other hand, when the small rotor has been used, the time $t_3$ (min) required for the Mooney viscosity value to reach $(V_m+_3)$ is recorded. As the values of $t_5$ or $t_3$ become greater, the scorch resistance is deemed to be higher. At the same time, the time $t_{35}$ or $t_{18}$ required for the Mooney viscosity value to reach $(V_m+_{35})$ or $(V_m+_{18})$ is also recorded. The value $(t_{35}-t_5)$ or $t_{18}-t_3)$ is a criterion which indicates the degree of the vulcanization rate.

EXAMPLES I–XIV AND CONTROLS T–III

|  | Parts by Weight |
|---|---|
| Polyepichlorohydrin rubber *1 | 100 |
| Red lead | 5 |
| FEF grade carbon black *2 | 5 |
| 2-Mercaptoimidazoline | 1.5 |
| Antiscorching agent | Variant amounts |
| *1 Hydrin 100, a product of Goodrich Chemical Company, U.S.A. | |
| *2 Asahi carbon 060 | |

A blend of the foregoing components is kneaded together at below 100° C. using 3-inch rolls. A specimen is taken from this kneaded blend and the Mooney scorch test is conducted at 120° C. in accordance with the JIS K–6300 method of the Japanese Industrial Standard. Further, the properties of the cross-linked rubber obtained by a cross-linking reaction for 30 minutes at 155° C. as well as the properties of this cross-linked rubber after ageing for 3 days at 150° C. in a test tube were also tested in accordance with JIS K–6301. The results obtained in these tests are shown in table I.

In carrying out the examples given herein, the cross-linking reaction and ageing conditions identical to those given above were employed.

When control I and examples I–VI, control II and examples VII–XI, and control III and examples XII, XIII and XIV are respectively compared, it can be seen that the antiscorching agent of the present invention demonstrates a pronounced scorch preventive effect without any adverse effects on the properties of the cross-linked rubber.

EXAMPLES xt–XVII AND CONTROL IV

|  | Part by weight |
|---|---|
| Polychloroprene rubber *1 | 100 |
| Red Lead | 5 |
| FEF grade carbon black *2 | 50 |
| 2-Mercaptoimidazoline | 1.5 |
| Antiscorching agent | Variant amounts |
| *1 Neoprene WRT produced by Showa Neoprene Company, Japan | |
| *2 Identical to those of example I. | |

The foregoing composition is kneaded together at below 100° C. using 3-inch rolls. A specimen is taken from this kneaded product and the Mooney scorch test is conducted at 120° C. in accordance with the JIS K–6300 method. Further, the cross-linked rubber is tested for its properties in accordance with the JIS K–6300 method. The results obtained in these tests are shown in table II.

EXAMPLES XVIII–XIX AND CONTROL V

|  | Part by weight |
|---|---|
| Ethylacrylate-2-chloroethylvinyl ether copolymer rubber *1 | 100 |
| Red lead | 5 |
| FEF grade carbon black *2 | 50 |
| 2-Mercaptoimidazoline | 1.5 |
| Antiscorching agent | Variant amounts |
| *1 Hicar-4201 produced by Goodrich Chemical Company, U.S.A. | |
| *2 Identical to those of example I. | |

The foregoing blend is kneaded together at below 100° C. using 3-inch rolls. The Mooney scorch test at 120° C. and the tests of the properties of the cross-linked rubber were conducted as in example I with the results shown in table III.

EXAMPLES XX–XXI AND CONTROL VI

|  | Part by weight |
|---|---|
| Epichlorohydrin-ethylene oxide copolymer rubber *1 | 100 |
| Red lead | 5 |
| FEF grade carbon black *2 | 50 |
| 2-Mercaptoimidazoline | 1.5 |
| Antiscorching agent | 0.5 |
| *1 Hydrin 200 produced by Goodrich Chemical Company, U.S.A. | |
| *2 Identical to those of Example I. | |

The operations as in example I are repeated with a blend of the foregoing composition. The results obtained are shown in table IV.

TABLE I

| Experiment | Anti-scorching agent | Amount added (phr.) | Mooney scorch test 120° C. | | | | Properties of cross-linked rubber | | | | Properties of cross-linked rubber after aging | | | |
|---|---|---|---|---|---|---|---|---|---|---|---|---|---|---|
| | | | Minimum viscosity (Mooney) | Time required for rise of— | | | Tensile strength (kg./cm.²) | Elongation percent | 100% modulus (kg./cm.²) | Hardness (JIS) | Tensile strength (kg./cm.²) | Elongation (percent) | 100% modulus (kg./cm.²) | Hardness (JIS) |
| | | | | 5 Mooney value units (min.) | 35 Mooney value units (min.) | | | | | | | | | |
| Control I | Not incorporated | | 58.5 | 8.9 | 15.1 | | 154 | 310 | 72 | 77–74 | 154 | 130 | 123 | 81–79 |
| Example: | | | | | | | | | | | | | | |
| I | Orthoaminothiophenol | 0.1 | 57.0 | 10.3 | 15.9 | | 149 | 280 | 76 | 76–74 | 176 | 130 | 143 | 82–79 |
| II | do | 0.2 | 60.0 | 11.8 | 17.6 | | 151 | 270 | 73 | 76–74 | 167 | 130 | 133 | 78–75 |
| III | do | 0.3 | 60.0 | 13.0 | 19.6 | | 147 | 290 | 71 | 75–73 | 166 | 120 | 143 | 82–79 |
| IV | 2-mercaptoethylamine | 0.1 | 54.5 | 11.0 | 15.9 | | 156 | 280 | 73 | 76–74 | 159 | 130 | 125 | 82–80 |
| V | do | 0.2 | 53.0 | 11.2 | 17.2 | | 153 | 270 | 75 | 76–74 | 158 | 130 | 125 | 81–78 |
| VI | do | 0.3 | 50.5 | 11.2 | 18.1 | | 153 | 280 | 77 | 76–73 | 140 | 130 | 115 | 81–78 |
| Control II | Not incorporated | | 50.5 | 8.5 | 13.5 | | 157 | 310 | 69 | 73–69 | 168 | 120 | 133 | 81–78 |
| Example: | | | | | | | | | | | | | | |
| VII | Orthoaminothiophenol | 0.5 | 52.5 | 17.0 | 30.0 | | 150 | 300 | 65 | 76–73 | 165 | 120 | 139 | 89–86 |
| VIII | do | 1.0 | 56.5 | 18.5 | 29.0 | | 152 | 300 | 74 | 73–69 | 167 | 130 | 131 | 88–85 |
| IX | do | 2.0 | 49.0 | 15.5 | 26.0 | | 135 | 280 | 72 | 80–75 | 121 | 130 | 101 | 85–82 |
| X | 2-mercaptoethylamine | 0.5 | 52.5 | 10.5 | 17.0 | | 145 | 290 | 71 | 77–73 | 184 | 150 | 123 | 85–82 |
| XI | do | 1.0 | 51.0 | 9.5 | 15.2 | | 148 | 270 | 72 | 80–75 | 144 | 180 | 81 | 83–79 |
| | Not incorporated | | 55.0 | 8.7 | 14.1 | | 152 | 300 | 70 | 75–73 | 160 | 130 | 127 | 81–78 |
| Control III | | | | | | | | | | | | | | |
| Example: | | | | | | | | | | | | | | |
| XII | L-cysteine | 0.5 | 53.5 | 12.0 | 21.5 | | 149 | 290 | 68 | 74–73 | 159 | 110 | 133 | 85–80 |
| XIII | Iminoethylmercaptan | 0.5 | 56.5 | 13.7 | 23.0 | | 153 | 290 | 72 | 76–75 | 167 | 120 | 133 | 89–87 |
| XIV | Thioglycollic acid | 0.5 | 54.0 | 11.0 | 19.5 | | 150 | 330 | 69 | 79–71 | 155 | 135 | 120 | 84–80 |

TABLE II

| Experiment | Anti-scorching agent | Amount added (phr.) | Mooney scorch test 150° C. MS | | | Properties of cross-linked rubber | | | | Properties of cross-linked rubber after aging | | | |
|---|---|---|---|---|---|---|---|---|---|---|---|---|---|
| | | | Minimum viscosity (Mooney) | Time required for rise of— | | Tensile strength (kg./cm.²) | Elongation (Percent) | 100% modulus (kg./cm.²) | Hardness (JIS) | Tensile strength (kg./cm.²) | Elongation (percent) | 100% modulus (kg./cm.²) | Hardness (JIS) |
| | | | | 3 Mooney value units (min.) | 18 Mooney value units (min.) | | | | | | | | |
| Control IV | Not incorporated | | 89.0 | 1.8 | 2.2 | 203 | 130 | 156 | 79–78 | 183 | 110 | 169 | 81–79 |
| Example: | | | | | | | | | | | | | |
| XV | Orthoaminothiophenol | 0.5 | 86.0 | 3.1 | 4.9 | 240 | 160 | 151 | 76–74 | 189 | 130 | 163 | 79–77 |
| XI | do | 2.0 | 85.0 | 3.0 | 8.5 | 245 | 170 | 147 | 75–72 | 198 | 135 | 158 | 83–82 |
| XVII | 2-mercaptoethylamine | 0.5 | 89.0 | 2.8 | 3.5 | 221 | 130 | 150 | 77–76 | 191 | 120 | 165 | 81–79 |

TABLE III

| Experiment | Anti-scorching agent | Amount added (phr.) | Mooney scorch test 160° C. MS | | | Properties of cross-linked rubber | | | | Properties of cross-linked rubber after aging | | | |
|---|---|---|---|---|---|---|---|---|---|---|---|---|---|
| | | | Minimum viscosity (Mooney) | Time required for rise of— | | Tensile strength (kg./cm.²) | Elongation (percent) | 100% modulus (kg./cm.²) | Hardness (JIS) | Tensile strength (kg./cm.²) | Elongation (percent) | 100% modulus (kg./cm.²) | Hardness (JIS) |
| | | | | 3 Mooney value units (min.) | 18 Mooney value units (min.) | | | | | | | | |
| Control V | Not incorporated | | 44.5 | 6.9 | 10.1 | 119 | 440 | 30 | 62–56 | 162 | 180 | 85 | 77–73 |
| Example: | | | | | | | | | | | | | |
| XVIII | Orthoaminothiophenol | 0.5 | 42.0 | 18.9 | 24.6 | 111 | 550 | 26 | 61–55 | 170 | 230 | 73 | 76–71 |
| XIX | 2-mercaptoethylamine | 0.5 | 42.0 | 10.6 | 14.9 | 105 | 530 | 27 | 62–56 | 162 | 220 | 63 | 76–71 |

EXAMPLES XXII-XXIII AND CONTROL VII

|  | Part by weight |
|---|---|
| Chlorinated polyethylene *1 | 100 |
| Red Lead | 5 |
| FEF grade carbon black *2 | 50 |
| 2-Mercaptoimidazoline | 1.5 |
| Antiscorching agent | 0.5 |
| *1 Elaslene 402A produced by Showa Neoprene Company, Japan | |
| *2 Identical to those of example I. | |

Example I is repeated using a blend of the foregoing composition with the results shown in table V.

EXAMPLES XXIV-XXI AND CONTROLS VIII-XII

|  | Part by weight |
|---|---|
| Polyepichlorohydrin rubber *1 | 100 |
| Red lead | 5 |
| FEF grade carbon black *2 | 50 |
| 2-Mercaptoimidazoline | 1.5 |
| Antiscorching agent | 0.5 |
| *1 and *2 Identical to those of Example I. | |

Example I is repeated using a blend of the foregoing composition with the results shown in table VI.

When comparisons are made between example XXIV and controls VIII, IX and X, and between example XXV and controls VIII, XI and XII, it can be seen that the antiscorching agent according to the present invention not only demonstrates a pronounced scorch resistance as compared with the other monofunctional compounds but also does not cause a substantial drop in the properties of the cross-linked rubber, and especially the modulus, thus indicating that it is of great value commercially.

EXAMPLES XXVI-XXVII AND CONTROLS XIII-XV

|  | Part by weight |
|---|---|
| Polyepichlorohydrin rubber *1 | 100 |
| Red lead | 5 |
| FEF grade carbon black *2 | 50 |
| 2-Mercaptoimidazoline | 1.5 |
| Antiscorching agent | 0.5 |
| *1 and *2 Identical to those of Example I. | |

The foregoing blend is submitted to the same operations as in example I with the results shown in table VII.

When examples XXVI and XXVII are compared with controls XIII, XIV and XV, it can be seen that while there are some among the conventional antiscorching agents which demonstrate some scorch resistance, that demonstrated by the antiscorching agent of the present invention is far greater and moreover there is the advantage that the properties of the cross-linked rubber are not adversely affected by the antiscorching agent of the present invention.

We claim:

1. A halogen-containing polymeric rubber composition having improved scorch resistance, which comprises per 100 parts by weight of a halogen-containing polymeric rubber selected from the group consisting of polychloroprene rubber, a chlorinated polyethylene rubber, a halogen-containing acrylic rubber, polyepichlorohydrin rubber, an epichlorohydrin-olefin oxide copolymer rubber, a chlorinated butyl rubber and a fluorine-containing rubber, 0.1-5.0 parts by weight of an antiscorching agent comprising at least one compound expressed by the following formula SH-R-(X)$_n$ wherein R is a member selected from the group consisting of lower aliphatic, cyclohexyl and aromatic

TABLE IV

| Experiment | Anti-scorching agent | Amount added (phr.) | Mooney scorch test 150° C. MS | | | Properties of cross-linked rubber | | | |
|---|---|---|---|---|---|---|---|---|---|
| | | | Minimum viscosity (Mooney) | Time required for rise of— | | Tensile strength (kg./cm.²) | Elongation (percent) | 100% modulus (kg./cm.²) | Hardness (JIS) |
| | | | | 3 Mooney value units (min.) | 18 Mooney value units (min.) | | | | |
| Control VI | Not incorporated | | 54.0 | 6.9 | 12.6 | 143 | 320 | 63 | 77-74 |
| Example: | | | | | | | | | |
| XX | Orthoaminothiophenol | 0.5 | 54.5 | 9.0 | 22.0 | 131 | 300 | 61 | 78-75 |
| XXI | 2-mercaptoethylene diamine | 0.5 | 54.5 | 8.0 | 15.3 | 142 | 290 | 65 | 78-74 |

TABLE V

| Experiment | Antiscorching agent | Amount added (phr.) | Mooney scorch test 150° C. MS | | | Properties of cross-linked rubber | | | | Properties of cross-linked rubber after aging | | | |
|---|---|---|---|---|---|---|---|---|---|---|---|---|---|
| | | | Minimum viscosity (Mooney) | Time required for rise of— | | Tensile strength (kg./cm.²) | Elongation (percent) | 100% modulus (kg./cm.²) | Hardness (JIS) | Tensile strength (kg./cm.²) | Elongation (percent) | 100% modulus (kg./cm.²) | Hardness (JIS) |
| | | | | 3 Mooney value units (min.) | 18 Mooney value units (min.) | | | | | | | | |
| Control VII | Not incorporated | | 90.0 | 3.2 | 19.3 | 210 | 350 | 89 | 85-78 | 175 | 90 | | 85-83 |
| Example: | | | | | | | | | | | | | |
| XXII | Orthoaminothiophenol | 0.5 | 93.5 | 4.0 | 25 | 207 | 410 | 83 | 84-78 | 166 | 85 | | 87-85 |
| XXIII | 2-mercaptoethylene diamine | 0.5 | 98.0 | 4.5 | 25 | 202 | 400 | 84 | 83-78 | 159 | 90 | | 88-85 |

TABLE VI

| Experiment | Anti-scorching agent | Amount added (phr.) | Mooney scorch test 120° C. | | | Properties of cross-linked rubber | | | |
|---|---|---|---|---|---|---|---|---|---|
| | | | Minimum viscosity (Mooney) | Time required for rise of— | | Tensile strength (kg./cm.$^2$) | Elongation (percent) | 100% modulus (kg./cm.$^2$) | Hardness (JIS) |
| | | | | 5 Mooney value units (min.) | 35 Mooney value units (min.) | | | | |
| Control VIII | Not incorporated | | 43.5 | 8.4 | 14.9 | 157 | 290 | 71 | 73-70 |
| Example XXIV | Orthoaminothiophenol | 0.5 | 40.0 | 16.4 | 30.6 | 153 | 300 | 70 | 74-71 |
| Control: | | | | | | | | | |
| IX | Thiophenol | 0.5 | 43.5 | 10.7 | 17.4 | 140 | 330 | 59 | 72-69 |
| X | Aniline | 0.5 | 44.0 | 8.3 | 13.7 | 141 | 320 | 60 | 74-72 |
| Example XXV | 2-mercaptoethylamine | 0.5 | 44.5 | 12.5 | 17.9 | 152 | 290 | 73 | 73-71 |
| Control: | | | | | | | | | |
| XI | Ethyl mercaptan | 0.5 | 46.0 | 9.7 | 15.4 | 145 | 310 | 62 | 72-69 |
| XII | Ethylamine | 0.5 | 43.5 | 9.8 | 14.1 | 141 | 320 | 57 | 70-67 |

TABLE VII

| Experiment | Anti-scorching agent | Amount added (phr.) | Mooney scorch test 120° C. | | | Properties of cross-linked rubber | | | |
|---|---|---|---|---|---|---|---|---|---|
| | | | Minimum viscosity (Mooney) | Time required for rise of— | | Tensile strength (kg./cm.$^2$) | Elongation (percent) | 100% modulus (kg./cm.$^2$) | Hardness (JIS) |
| | | | | 5 Mooney value units (min.) | 35 Mooney value units (min.) | | | | |
| Control XIII | Not incorporated | | 45.0 | 7.5 | 12.9 | 157 | 290 | 75 | 78-74 |
| Example: | | | | | | | | | |
| XXVI | Orthoaminothiophenol | 0.5 | 42.5 | 17.0 | 30.5 | 153 | 300 | 71 | 76-75 |
| XXVII | 2-mercaptoethylamine | 0.5 | 47.5 | 10.5 | 17.0 | 152 | 290 | 73 | 78-71 |
| Control: | | | | | | | | | |
| XVI | Phthalic anhydride | 0.5 | 39.5 | 8.7 | 15.7 | 150 | 320 | 66 | 75-71 |
| XV | Benzoic acid | 0.5 | 38.5 | 7.1 | 12.7 | 152 | 310 | 67 | 78-74 | hydrocarbon radicals, X is a member selected from the group consisting of —NH$_2$,=NH and —COOH, and $n$ is an integer of 1 or 2.

and 0.5–5.0 parts by weight of an amino-containing cross-linking agent.

2. The halogen-containing polymeric rubber composition of claim 1 wherein said amino-containing cross-linking agent is selected from hydrocarbyl aliphatic polyamines, hydrocarbyl aromatic polyamines, polyamine carbamates, keto–and thioketopolyamines, 2-mercaptoimidazolines and 2-mercaptopyrimidines.

3. An epichlorohydrin polymer rubber composition having improved scorch resistance, which comprises per 100 parts by weight of polyepichlorohydrin rubber, 0.1–5.0 parts by weight of an aminothiophenol and 0.5–5.0 parts by weight of 2-mercaptoimidazoline.

4. An epichlorohydrin-ethylene oxide copolymer rubber composition having improved scorch resistance, which comprises per 100 parts by weight of an epichlorohydrin-ethylene oxide copolymer rubber, 0.1–5.0 parts by weight of an aminothiophenol and 0.5–5.0 parts by weight of 2-mercaptoimidazoline.

* * * * *